United States Patent [19]

Robbins et al.

[11] Patent Number: 5,051,384

[45] Date of Patent: Sep. 24, 1991

[54] METHOD FOR PRETREATING A REFORMING CATALYST

[75] Inventors: John L. Robbins, Stockton; Elise Marucchi-Soos, Warren; Ming Chow, Three Bridges; William E. Gates, Somerset; Shun C. Fung, Bridgewater, all of N.J.

[73] Assignee: Exxon Research and Engineering Company, Florham Park, N.J.

[21] Appl. No.: 497,170

[22] Filed: Mar. 22, 1990

[51] Int. Cl.$^5$ .......................... B01J 29/04; B01J 21/14; B01J 23/36; B01J 23/40
[52] U.S. Cl. .......................................... 502/62; 502/66; 502/74; 502/241; 502/261; 502/327; 502/521
[58] Field of Search ................... 502/62, 66, 241, 261, 502/327, 521, 74; 208/138

[56] References Cited

U.S. PATENT DOCUMENTS

| | | | |
|---|---|---|---|
| 3,438,888 | 4/1969 | Spurlock | 208/138 |
| 3,556,985 | 1/1971 | McCoy | 208/138 |
| 3,592,780 | 7/1971 | Rashkin | 502/223 |
| 3,681,234 | 8/1972 | Fraini et al. | 208/138 |
| 3,793,183 | 2/1974 | Mahoney et al. | 208/138 |
| 4,097,543 | 6/1978 | Haag et al. | 585/471 |
| 4,141,589 | 2/1979 | Plank et al. | 502/66 |
| 4,261,810 | 4/1981 | McHale et al. | 208/138 |
| 4,539,305 | 9/1985 | Wilson et al. | 502/66 |

Primary Examiner—Carl F. Dees
Attorney, Agent, or Firm—S. Fletcher-Watts; E. C. Babinski

[57] ABSTRACT

Supported Group VIII noble metal reforming catalysts are pretreated with an unsaturated aliphatic hydrocarbon at elevated temperatures, thereby lower activity during initial reforming operation and reducing gas production during the initial operation.

16 Claims, 1 Drawing Sheet

METHOD FOR PRETREATING A REFORMING CATALYST

BACKGROUND OF THE INVENTION

1. Field of the Invention

The present invention relates to a method for pretreating a catalyst comprising at least one Group VIII noble metal and a support material prior to its use in a catalytic reforming process. The pretreatment passivates the activity of the catalyst during the initial stages of reforming.

2. Description of the Prior Art

Catalytic reforming is a process for converting hydrocarbon feedstocks containing mainly saturated hydrocarbons to more valuable aromatic compounds. Typically, naphtha, a mixture of paraffins, naphthenes and aromatics, is reformed to produce gasolines with high octane number. The reforming process is generally carried out by passing the naphtha over a suitable catalyst in the presence of hydrogen at elevated temperatures and pressures. The catalyst employed is generally platinum carried on a support material, for example alumina, silica, silica-alumina or crystalline aluminosilicates (zeolites). The catalyst may also include a second metal component, for example rhenium, tin or another Group VIII noble metal such as iridium or rhodium.

The reforming of naphtha involves several different reactions including isomerization, dehydrogenation of naphthenes to aromatics, dehydrogenation of paraffins to olefins, dehydrocyclization of paraffins and olefins to aromatics, and hydrocracking of paraffins to gaseous hydrocarbons such as methane and other lower alkanes. Ideally the reforming process minimizes the hydrocracking of paraffins and maximizes the reactions leading to the formation of more valuable products, particularly dehydrocyclization and dehydrogenation to aromatics.

During the initial stages of the reforming process the platinum-containing catalyst exhibits a high degree of hydrocracking activity leading to excessive formation of undesirable light hydrocarbons. As well as giving a lower yield of desired aromatic compounds, the hydrocracking reaction has the disadvantage that it is highly exothermic and can lead to temperature runaway in the reactor.

To lower the initial hydrocracking activity of the catalyst, it is known to passivate the catalyst by pretreating it with a sulfur-containing fluid such as hydrogen sulfide gas or an organic sulfide. This treatment has the disadvantage that it involves the use of a toxic, pungent, corrosive substance. Also, when the support material is a zeolite, especially a zeolite containing 1-dimensional channel-shaped pores such as a type L zeolite, the sulfur leads to excessive deactivation of the catalyst.

Other passivation techniques have been suggested in the past. U.S. 3,592,780 discloses a pretreatment method in which a platinum catalyst is contacted with naphtha containing at least 200 ppm sulfur in the presence of hydrogen at elevated temperatures and pressures for a number of hours. In U.S. 3,438,888 the pretreatment method consists of contacting a platinum-rhenium catalyst with a highly aromatic hydrocarbon stock at reforming conditions, in the presence of hydrogen, at elevated temperatures and pressures. This pretreatment is carried out for at least 0.5 hour and preferably a number of hours. To our knowledge neither of the pretreatment processes disclosed in these two patents has been used commercially.

SUMMARY OF THE INVENTION

The present invention relates to a new passivation method and accordingly provides a method for pretreating a reforming catalyst comprising at least one Group VIII noble metal and a support, the method comprising contacting the catalyst with an unsaturated aliphatic hydrocarbon at a temperature from 200° C. to 500° C.

The method according to the invention lowers the level of activity of the catalyst during the initial stages of reforming and thereby decreases the amount of undesired gaseous hydrocarbons produced, and alleviates the danger of temperature runaway in the reactor. This catalyst passivation is achieved without the use of unpleasant, toxic sulphur compounds, and the method can be applied to zeolite-supported catalysts without excessively deactivating the catalyst.

DESCRIPTION OF THE INVENTION

Figure 1:
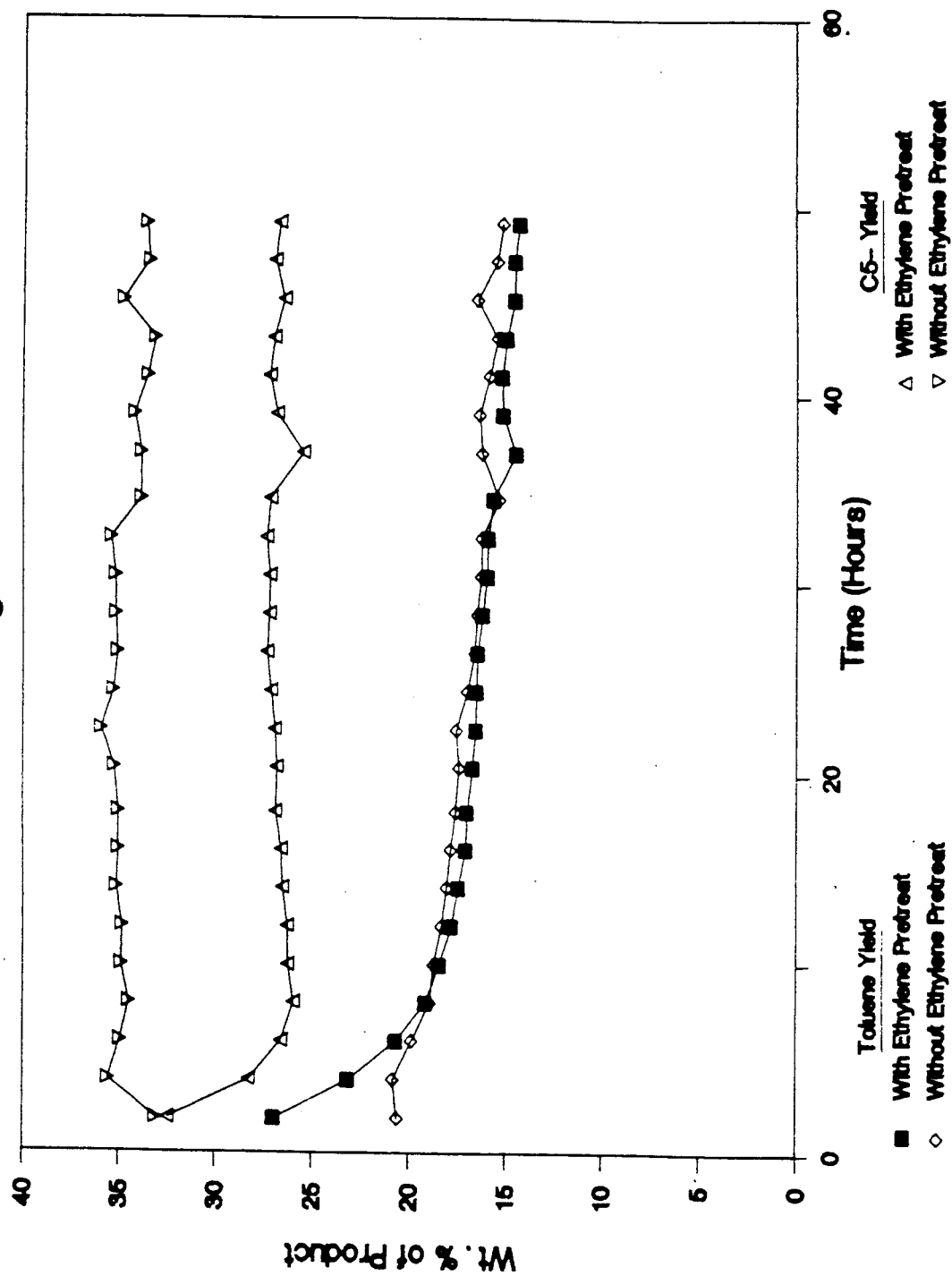
FIG. 1, the sole drawing, is a graph showing the results obtained from using a catalyst pretreated with olefin, in accordance with the present invention, in a catalytic reforming process. The graph also shows comparative results obtained from using an equivalent, untreated catalyst.

The unsaturated aliphatic hydrocarbon with which the catalyst is pretreated is preferably an olefin. It is also preferably in the gaseous phase, and therefore, preferred olefins are ethylene and propylene or a mixture thereof. Hereinafter, the invention will be described with reference to olefins, although it is to be understood that other unsaturated aliphatic hydrocarbons may be substituted for the olefins.

When the catalyst is contacted with the olefin it is believed that the olefin reacts to deposit carbon on the surface of the catalyst. It is thought that the carbon is adsorbed on to some of the noble metal particles and that these metal particles then become deactivated towards naphtha reforming at least until the carbon is removed, for example by reaction with the hydrogen present in the reforming process. The olefin reaction therefore requires controlling so that sufficient carbon is deposited to passivate the catalyst during the initial stages of reforming and hence inhibit undesired hydrocracking reactions, without depositing so much carbon that it completely deactivates the catalyst towards the reforming of naphtha to desired products such as aromatic hydrocarbons.

An important controlling parameter is the temperature at which the olefin reaction is carried out which must be between 200° C. and 500° C., prefereably 300° C. to 500° C. If too high a temperature is used then the yield of desired aromatic products drops substantially which is due, it is thought, to an excess of carbon being adsorbed onto the catalyst as a result of the olefin reaction. Conversely, if too low a temperature is used then the catalyst behaves much the same as a fresh, unpassivated catalyst and it is thought this is due to insufficient carbon being deposited during the olefin reaction to affect the high initial hydrocracking activity levels of the catalyst. Preferably the olefin is contacted with the catalyst as a gaseous stream containing at least 0.1% by volume olefin, more preferably from 0.1 to 10%, especially 0.1 to 5%. The remainder of the gas is preferably an inert gas, for example nitrogen or helium. The gaseous stream may be fed into the reactor, for example a reforming reactor, as a continuous flow or as a series of pulses. Alternatively, the inert gas may be fed into the reactor as a continuous flow and the olefin injected into the inert gas flow at regular intervals. As another alternative, the olefin may be introduced into a reactor employing a recycle stream in which an oxygen-free inert gas, such as helium or nitrogen, is circulating through the catalyst bed. The olefin, in a calculated amount of from 3 to 1000 carbon atoms per surface noble metal atom is added to the recycle stream either all at once or at regular intervals.

The reaction of the olefin with the catalyst may be carried out at any suitable pressure, although for practical purposes this would not normally exceed 40 MPa. Conveniently the reaction may be carried out at atmospheric pressure.

The catalyst is preferably contacted with the olefin for a period of from 3 minutes to 2 hours, preferably from 5 minutes to 1.5 hours, and especially 5 to 50 minutes.

The pretreatment method of the invention also has the advantage this is essentially thermoneutral. It is believed this is because two main reactions occur when the catalyst is contacted with the olefin. In one reaction olefin is adsorbed on to the noble metal and decomposes to release hydrogen, which is an endothermic reaction. In another reaction the hydrogen released by the first reaction reacts with free olefin to produce alkanes, which is an exothermic reaction. The alkanes pass out of the reactor with the flow of gas passing through the reactor. Thus the endothermic and exothermic reactions essentially balance each other and hence result in a thermoneutral reaction.

If desired, the reaction of the catalyst with the olefin may be followed by an annealing step in order to stabilize the deposited carbon. This annealing may be carried out by heating the catalyst in an inert gas atmosphere, for example, helium or nitrogen at a temperature of 300 to 550 C., preferably 400 to 500° C., for a period of 30 minutes to 2 hours.

Advantageously the olefin pretreatment according to the invention is carried out in the substantial absence of oxygen and water. These can react with the carbon deposited on the catalyst surface to form carbon monoxide which is a known poison for reforming catalysts.

The pretreatment method may be applied to both freshly synthesized catalysts and to regenerated catalysts. The method of preparing the fresh and regenerated catalysts can be any of the conventional methods well known in the industry, although to take full benefit of the invention it is advantageous to prepare the catalysts in the essential absence of sulfur.

Usually the final stage in the preparation of a fresh or regenerated catalyst is reduction, typically by contacting the catalyst with hydrogen at a temperature from 250 to 650° C. For example, the catalyst is heated at a temperature of from about 300 to about 530° C. for up to 10 hours in the presence of a gaseous stream comprising from 0.2 to 100% by volume of hydrogen, the balance being an inert gas such as nitrogen. Optionally the catalyst may be dried prior to reduction by contacting it with a dry inert gas at a temperature from about 50 to about 500° C. The pretreatment method according to the invention is preferably included after this reduction step. The catalyst may be treated again with hydrogen after the olefin treatment. The subsequent hydrogen treatment will tend to remove some of the carbon deposited on the catalyst during the olefin pretreatment process. This may be beneficial if a higher initial level of catalytic activity is required, for example if reforming is to be carried out at a relatively low initial temperature or if the feedstock for reforming contains relatively high molecular weight hydrocarbons.

The Group VIII noble metals which are necessary for catalytic activity are those metals from Group VIII of the Periodic Table of Elements which are selected from ruthenium, rhodium, iridium, palladium and platinum. Preferably, the metals which are employed herein are platinum, rhodium or iridium, and most preferably platinum or a combination of two or more metals, one of which is platinum. The metals may be present in any combination desired. Rhenium, a Group VIIB metal, may also be present so long as at least one Group VIII noble metal is present.

The amount of Group VIII noble metal present in the catalyst will be an effective amount and will depend, for example, on required catalyst activity, ease of uniform dispersion, and the type of catalyst support. For zeolites, crystal size limits the effective catalyst loading since highly loaded crystals of zeolite which have a large dimension parallel to the channels could easily lead to pore plugging during operation as the noble metal agglomerates inside the channels. Generally, however, the level of metal present will range from about 0.1 to 6%, preferably 0.1 to 3.5% and more preferably 0.1 to 2.5% by weight of the catalyst. Furthermore, for zeolites, the amount of metal present is generally from about 0.1 to 2.0% by weight of the catalyst if the average zeolite crystallite size parallel to the channels is greater than about 0.2 micron, and from about 1.0 to 6% by weight if the average zeolite crystalline size parallel to the channels is no greater than about 0.2 micron.

The Group VIII noble metals may be introduced on to the support by, for example, ion exchange, impregnation, carbonyl decomposition, adsorption from the gaseous phase, introduction during zeolite synthesis, and adsorption of metal vapor. The preferred technique is ion exchange. In some cases, e.g., when the metal(s) have been introduced on to zeolites by an ion-exchange process, it is preferred to remove the residual acidity of the support material by treating the catalyst, which has previously been reduced by hydrogen, with an aqueous solution of an alkaline base such as potassium carbonate. This treatment will neutralize any hydrogen ions formed during the reduction of Group VIII noble metal ions by hydrogen.

The catalyst support may be, for example, an inorganic oxide such as alumina, titanium dioxide, zinc oxide, magnesium oxide, thoria, chromia, zirconia, an amorphous silica-alumina, a zeolite, for example, faujasite, mordenite, X, Y or L zeolites, a clay such as china clay, kaolin, bentonite, diatomaceous earth or other silicon based materials such as silica gel or silicon carbide, or a mixture of one or more of the above. Preferably, the support is alumina or a zeolite, more preferably a zeolite, and especially a type L zeolite.

Type L zeolites may be defined as synthetic zeolites which crystallize in the hexagonal system. They have channel-shaped pores undulating from about 7 to 13λ in diameter and may occur in the form of cylindrical crystals with a mean diameter of at least 0.5 micron and an aspect ratio of at least 0.5 (as described, for example, in U.S. Pat. 4,544,539, the disclosure of which is incorporated herein by reference), as well as in other shapes and sizes. L zeolites typically have the general formula:

$$0.9-1.3M_{2/n}O:Al_2O_3:xSiO_2:yH_2O$$

where M represents an exchangeable cation, n represents the valency of M, y is any value from zero to about 9, and x is about 5.2 to about 6.9.

A more complete description of L zeolite is given in U.S. Patent 3,216,789 the disclosure of which is incorporated herein by reference.

The type L zeolites are conventionally prepared such that M in the above formula is potassium. See, for example, U.S. Pat. Nos. 3,216,789 and 3,867,512. The potassium can be ion exchanged, as is well known, by treating the zeolite in an aqueous solution containing other cations. It is difficult, however, to exchange more than 75% of the original potassium cations, because some cations occupy sites in the zeolite structure which are nearly inaccessible. At least 75% of the exchangeable cations are selected from lithium, sodium, potassium, rubidium, cesium, calcium and barium. More preferably, the cation is sodium, potassium, rubidium or cesium, and most preferably potassium. Optionally, the exchangeable cations may consist of mixtures of the above-named Group IA cations or mixtures of a Group IA cation and barium or calcium cations. These mixtures of cations may be achieved, for example, by treating the zeolite L with an aqueous solution containing, e.g., a rubidium and/or cesium salt and then washing to remove excess ions. This ion exchange treatment can be repeated to effect further ion exchange, although to a lesser degree.

Particularly preferred catalysts are platinum/alumina, platinum/zeolite, especially platinum/L zeolite, platinum-rhenium/alumina and platinum-iridium/alumina.

EXAMPLES

The invention will now be illustrated by the following Examples.

EXAMPLE 1

A catalyst consisting of platinum on a potassium-exchanged zeolite ("Pt/KL zeolite") was prepared as follows:

An L zeolite having a composition expressed in moles of pure oxide of $0.99 K_2O:Al_2O_3:6.3SiO_2: xH_2O$ and having a cylindrical shape and an average particle size of about 2 to 2.5 microns was prepared by the technique described in Example 1 of U.S. Pat. No. 4,544,539. Thus, an alkaline synthesis gel was prepared by dissolving 23.4 g of aluminum hydroxide by boiling in an aqueous solution of 51.2g potassium hydroxide pellets (86% pure KOH) in 100.2g water to form Solution A. After dissolution any water loss was corrected. A separate solution, Solution B, was prepared by diluting 225g colloidal silica (Ludox HS 40) with 195g water. Solutions A and B were mixed for two minutes to form a gel, and just before the gel became fully stiff, 224g thereof were transferred to a Teflon-lined autoclave, preheated to 150° C., and held at that temperature for 72 hours to bring about crystallization, after which the solid zeolite was separated out.

Platinum was then incorporated in the above prepared zeolite support by slurrying the zeolite in water and adding $Pt(NH_3)_4 Cl_2$ solution over about a 2 hour period at a pH of 10. Following the addition of the platinum solution the mixture was stirred overnight and filtered. The resulting Pt/KL zeolite which contained 0.6% Pt, was dried, tableted, crushed and screened to 20/40 mesh.

10g of the Pt/KL zeolite was then calcined at 350° C. in a reactor at atmospheric pressure with a gas stream of 10% dry $O_2$ at a flow rate of 500 ml/minute for 2 hours. The catalyst was then reduced with a gas stream of 10% $H_2$ at a flow rate of 500 ml/minute for 2 hours at a temperature of 400° C. The resulting catalyst is hereinafter referred to as untreated Pt/KL catalyst.

The catalyst was then pretreated with olefin prior to use in a reforming process. 0.25g of the untreated Pt/KL catalyst was charged into a quartz reactor and treated with 100 ml/minute $H_2$ at 510° C. for 2 hours and then cooled to 377° C. in flowing $H_2$. The reactor was then purged with 100 ml/minute He at 350° C. for 10 minutes, followed by treatment with 100 ml/minute 1% ethylene in He for 5 minutes at 350° C. The ethylene/He flow was then discontinued and 100 ml/minute $H_2$ was introduced as the reactor temperature was increased to 377° C.

The performance of the ethylene treated catalyst was evaluated using a hexane reforming test. After continuing the flow of the $H_2$ for 5 minutes hexane was introduced at an $H_2$:hexane ratio of 16:1 and the reforming was carried out at atmospheric pressure, a temperature of 377° C. and a space velocity of 6.6 V/V/hour, The products obtained in this reforming test were measured after 5 and 155 minutes catalyst operation under the above conditions. The results are given in Table 1.

For comparative purposes the performance of the untreated Pt/KL catalyst was also evaluated. 2.5g of the above prepared untreated Pt/KL catalyst was charged into a quartz reactor and treated with 100 ml/minute $H_2$ at 510° C. for 2 hours and then cooled to 377° C. in flowing $H_2$. A hexane reforming test was then carried out using the same conditions as described above for the ethylene treated catalyst. The results are also given in Table 1.

TABLE 1

| | Catalyst | | | |
|---|---|---|---|---|
| | Pt/KL | | Ethylene-treated Pt/KL | |
| Time on stream (min) | 5 | 155 | 5 | 155 |
| Total Hexane Conversion (%) | 31.2 | 25.6 | 22.7 | 21.9 |
| Product Concentration (wt. %) | | | | |
| $C_1$-$C_5$[1] | 3.2 | 2.1 | 2.1 | 1.7 |
| MCP + 2MP + 3MP[2] | 13.7 | 11.2 | 9.9 | 9.5 |
| Benzene | 13.8 | 11.9 | 10.4 | 10.5 |

[1] Hydrocracking products, $C_1$ to $C_5$ paraffins
[2] Isomerization products, methylcyclopentane (MCP), 2-methylpentane (2MP), and 3-methylpentane (3MP).

The results show that after 5 minutes on stream the ethylene treated Pt/KL catalyst produced 34% less hydrocracking products ($C_1$-$C_5$ paraffins) than the equivalent untreated catalyst. At the same time the yield of desired benzene product is reduced by only 25% using the ethylene treated catalyst. After 155 minutes on stream the ethylene treated catalyst yielded 19% and 12% less hydrocracking products and benzene respectively. Thus the olefin pretreatment lowers the yield of undesired hydrocracking products without significantly reducing the yield of desired aromatic products.

EXAMPLE 2

In this Example a conventional platinum-rhenium catalyst was employed containing 0.3 wt. % Pt, 0.3 wt. % Re and 1 wt. % chlorine on a gamma alumina base. The catalyst extrudates are crushed and sieved to 20 to 40 mesh.

The catalyst was then pretreated with olefin prior to use in a reforming process. 0.25 g of the Pt-Re catalyst was charged into a glass reactor and treated with $H_2$ at a flow rate of 200 ml/minute at atmospheric pressure for 1 hour at 510° C. The catalyst was next purged with He at a flow rate of 400 ml/minute for 10 minutes and then followed by treatment with 1 vol. % ethylene in He at a flow rate of 100 ml/minute at a temperature of 300° C. for 5 minutes at atmospheric pressure. The flow of ethylene in He was discontinued and the catalyst purged with 400 ml/minute He at 300° C. for 10 minutes.

The performance of the ethylene treated Pt-Re catalyst was evaluated using a methylcyclopentane (MCP) reforming test. The catalyst was treated with $H_2$ at a flow rate of 500 ml/minute for 30 minutes at 400° C. and then cooled to 377° C. in flowing $H_2$. The hydrocarbon feed was then introduced at an $H_2$:MCP ratio of 18:1, a temperature of 370° C., a pressure of 1 atmosphere and a space velocity of 4.4. V/V/Hr. The results are given in Table 2.

The ethylene pretreatment and the MCP reforming test were repeated on two further fresh samples of the Pt-Re/$Al_2O_3$ except that the pretreatment temperature was altered to 400° and 450° C. respectively. These pretreated catalysts were also subsequently treated with He and $H_2$ as described above except that for the catalyst pretreated with ethylene at 450° C., the final hydrogen treatment was also carried out at 450° C. The results of the MCP reforming tests are also given in Table 2.

For comparative purposes the performance of the untreated Pt-Re/$Al_2O_3$ catalyst was also evaluated. 0.25 g of the catalyst was charged into a glass reactor and treated with $H_2$ followed by reforming with MCP as described for the ethylene pretreated catalyst. The results are again given in Table 2.

TABLE 2

| | Products from MCP Conversion (wt %) | | | | | | | | | |
|---|---|---|---|---|---|---|---|---|---|---|
| | $CH_4$ + CP | | 2MP + 3MP + $nC_6$ | | 1 MCPe | | Benzene | | Total Conversion | |
| Temp. (°C.) | 5* | 155* | 5 | 155 | 5 | 155 | 5 | 155 | 5 | 155 |
| 300 | 0.92 | 0.33 | 10.56 | 4.28 | 1.74 | 1.90 | 2.69 | 2.29 | 17.08 | 9.63 |
| 400 | 0.51 | 0.21 | 5.08 | 2.56 | 1.95 | 1.98 | 3.02 | 2.33 | 11.56 | 7.93 |
| 450 | 0.40 | 0.17 | 3.56 | 1.81 | 1.96 | 1.98 | 3.34 | 2.35 | 10.15 | 7.24 |
| No pretreatment | 1.03 | 0.30 | 12.00 | 4.04 | 1.67 | 1.88 | 3.21 | 2.29 | 19.22 | 9.29 |

*Time in minutes
CP = cyclopentane
2 MP = 2-methylpentane
3 MP = 3=methylpentane
1 MCPe = 1-methylcyclopentene The results show that by pretreating the catalyst with ethylene a considerable reduction in the amount of undesired alkanes (methane, cyclopentane, n-hexane and methylpentane) is achieved, especially during the initial stages of the reforming process, without any substantial loss in the yield of the desired dehydrogenation products (benzene and methylcyclopentene). As the alkanes arise from exothermic hydrocracking reactions, it is apparent that the ethylene pretreatment mitigates exotherms during the initial stages of the reforming process. The benefits are particularly noticeable for the catalysts pretreated at the higher temperatures of 400° and 450° C.

EXAMPLE 3

In this Example a platinum-iridium catalyst was employed containing 0.6 wt. % Pt, 0.6 wt. % Ir and 1 wt. % chlorine on a gamma alumina support. This catalyst was prepared according to the methods described in U.S. Pat. No. 3,953,368. The catalyst extrudates were crushed and sieved to 20 to 40 mesh.

The catalyst was then pretreated with olefin. 0.25 g of the catalyst was charged into a quartz reactor and then treated with H2 at a flow rate of 200 ml/minute at atmospheric pressure for 1 hour at 510° C., and then purged with 400 ml/minute He for 10 minutes at 450° C. Ethylene was then fed into the reactor as the gas stream consisting of 1 vol. % ethylene in He at a flow rate of 100 ml/minute for 5 minutes at a temperature of 450° C. at atmospheric pressure. The catalyst was then purged with He at a flow rate of 400 ml/minute for 10 minutes at a temperature of 450° C. and then with hydrogen at a flow rate of 500 ml/minute for 30 minutes at 450° C. The catalyst was cooled to 377° C. and a MCP reforming test was conducted as described in Example 2. The results are given in Table 3. For comparative purposes the performance of the untreated Pt-Ir/$Al_2O_3$ catalyst was also evaluated using the $H_2$ treatment and MCP reforming conditions as described in Example 2. The results are also given in Table 3.

TABLE 3

| | Catalyst and Time on Stream (min) | | | |
|---|---|---|---|---|
| Conversion | Pretreated | | Not Pretreated | |
| Products (wt %) | 5 | 155 | 5 | 155 |
| $CH_4$ + CP | 1.18 | 0.73 | 2.62 | 1.27 |
| $C_2$-$C_5$ paraffins | 2.49 | 1.01 | 6.72 | 2.07 |
| 2MP + 3MP + $nC_6$ | 6.85 | 3.92 | 16.83 | 7.73 |
| 1 MCPe | 1.76 | 1.88 | 1.42 | 1.77 |
| Benzene | 2.78 | 1.48 | 3.65 | 1.89 |
| Total Conversion | 16.02 | 9.70 | 32.46 | 15.49 |

CP = cyclopentane
2MP = 2-methylpentane
3MP = 3-methylpentane
1MCPe = 1-methylcyclopentene The results show that use of the ethylene pretreated catalyst results in a substantial reduction in the yield of undesired alkane products, especially in the initial stages of the reforming reaction. The yields of the desired dehydrogenation products, benzene and methylcyclopentene, are not substantially affected by the ethylene pretreatment.

EXAMPLE 4

A reforming catalyst containing 0.3 wt. % Pt, 0.3 wt. % Re and 0.84 wt. % chlorine was removed through a reactor after it had been used in a commercial naphtha reforming process for 1,000 hours, during which period it had been regenerated 4 times. Prior to its removal from the reactor the catalyst was treated with 0.2 vol. % oxygen in helium at 480° C. for 20 hours and then 2 vol. % oxygen in nitrogen at 510° C. for 10 hours. The catalyst extrudates were then crushed and sieved to 20 to 40 mesh.

The catalyst was then treated with olefin as described in Example 2 except that the temperature of the reactor during introduction of the ethylene-He stream and subsequent He purge and $H_2$ treatment was 400° C. instead of 450° C. The performance of this ethylene treated catalyst in reforming reaction was then evaluated using MCP as the hydrocarbon feed as described in Example 2. The results are given in Table 4.

A further 0.25 g of the removed catalyst was treated with ethylene as described above except that the temperature of the reactor during introduction of the ethylene feed and the subsequent helium purge and $H_2$ treatment were carried out at 450° C. This catalyst was also evaluated using a MCP reforming test as described above, and the results are also given in Table 4.

For comparative purposes the performance of the untreated catalyst was also evaluated. 0.25 g of the catalyst removed from the reactor, after undergoing the oxygen treatments as described above, was treated with $H_2$ as described in Example 2 and then evaluated using a MCP reforming test as described above, the results are also given in Table 4.

EXAMPLE 5

A reforming catalyst containing 0.6 wt. % Pt and 0.6 wt. % Ir was removed from a reactor after it had been used in a commercial naphtha reforming process for 1,000 hours, during which period it had been regenerated 4 times. Prior to its removal from the reactor the catalyst was treated with 0.4 vol. % oxygen in nitrogen for 20 hours at 480° C. and then with 2 vol. % oxygen in nitrogen for 20 hours at 520° C. The catalyst extrudates were crushed and sieved to 20 to 40 mesh.

0.25 g of the catalyst was then treated with ethylene as described in Example 2, except that the ethylene in helium, helium purge and hydrogen treatments were carried out at 350° C. The performance of the catalyst was then evaluated using a MCP reforming test also as described in Example 2.

A further 0.25 g of the catalyst was also treated with ethylene as described in Example 2 except that the ethylene, subsequent helium and hydrogen treatments were carried out at 400° C. Again the performance of this catalyst was evaluated using a MCP reforming test as described in Example 2, the results are given in Table 5.

For comparative purposes the performance of the untreated Pt-Ir catalyst was also evaluated, using a 0.25 g sample of the catalyst removed from the reactor, after the oxygen treatments as described above, and using the hydrogen treatment and MCP reforming conditions as described in Example 2. The results are also given in Table 5.

TABLE 5

| Temp. (°C.) | $CH_4$ + CP | | Products from MCP Conversion (wt %) | | | | | | | | |
|---|---|---|---|---|---|---|---|---|---|---|---|
| | | | $C_2$–$C_5$ Paraffins | | 2MP + 3MP + $nC_6$ | | 1 MCPe | | Benzene | | Total Conversion | |
| | 5* | 155* | 5 | 155 | 5 | 155 | 5 | 155 | 5 | 155 | 5 | 155 |
| 350 | 0.31 | 0.22 | 0.60 | 0.36 | 6.25 | 4.12 | 1.67 | 1.71 | 4.41 | 4.40 | 14.29 | 11.80 |
| 400 | 0.24 | 0.18 | 0.34 | 0.23 | 3.52 | 2.74 | 1.78 | 1.80 | 5.05 | 4.98 | 12.04 | 11.08 |
| No pre-treatment | 0.53 | 0.28 | 1.11 | 0.44 | 12.85 | 5.62 | 1.54 | 1.70 | 5.70 | 4.59 | 22.95 | 13.60 |

*Time in minutes
CP = cyclopentane
2 MP = 2-methylpentane
3 MP = 3=methylpentane
1 MCPe = 1-methylcyclopentene The results show that the ethylene treated catalysts give essentially the same yields of the desired products, benzene and methylcyclopentene, as the untreated catalyst, but a much lower yield of the undesired hydrocracking products.

TABLE 4

| Temp. (°C.) | $CH_4$ + CP | | Products from MCP Conversion (wt %) | | | | | | | |
|---|---|---|---|---|---|---|---|---|---|---|
| | | | 2MP + 3MP + $nC_6$ | | 1 MCPe | | Benzene | | Total Conversion | |
| | 5* | 155* | 5 | 155 | 5 | 155 | 5 | 155 | 5 | 155 |
| 400 | 0.46 | 0.27 | 4.23 | 2.92 | 1.94 | 1.94 | 3.98 | 3.55 | 11.43 | 9.45 |
| 450 | 0.36 | 0.20 | 2.87 | 1.81 | 1.91 | 1.96 | 4.11 | 3.37 | 10.00 | 8.07 |
| No pre-treatment | 0.83 | 0.36 | 8.91 | 4.43 | 1.87 | 2.03 | 5.32 | 3.45 | 18.06 | 11.09 |

*Time in minutes
CP = cyclopentane
2 MP = 2-methylpentane
3 MP = 3=methylpentane
1 MCPe = 1-methylcyclopentene The results show that the ethylene treated catalysts give much lower yields of the undesired hydrocracking products than the untreated catalyst, especially during the initial stages of the reforming process. In addition, the catalyst treated with ethylene at 400° C. gives high yields of benzene, the desired product, than the untreated catalyst after 155 minutes on stream.

EXAMPLE 6

0.5 g of the regenerated Pt-Ir/Al$_2$O$_3$ catalyst obtained from the reactor described in Example 5 was mixed thoroughly with 0.5 g of a quartz diluent, and this catalyst/quartz mixture was charged into a 7 mm ID stainless steel reactor. The catalyst was treated with H$_2$ at a flow rate of 250 ml/minute for 30 minutes at a temperature of 500° C. and a pressure of 2 atmospheres. The reactor temperature was reduced to 450° C. and the catalyst purged with 250 ml/minute N$_2$ at a pressure of 2 atmospheres and a temperature of 450° C. for 10 minutes. The catalyst was then treated with ethylene by contacting it with a stream containing 1 vol. % ethylene in nitrogen at a pressure of 2 atmospheres and a flow rate of 100 ml/minute for 10 minutes at 450° C. The ethylene in nitrogen flow was discontinued and then nitrogen introduced at a flow rate of 250 ml/minute and a pressure of 2 atmospheres. The nitrogen flow was discontinued and the reactor was pressurised to 10.9 atmospheres with hydrogen at 450° C. Hydrogen was passed over the catalyst at this temperature and pressure for 30 minutes at a flow rate of 250 ml/minute.

The performance of this ethylene treated catalyst was then evaluated by measuring the products obtained in a reforming process with n-heptane. The reforming process was carried out at an H$_2$:heptane ratio of 5.9±0.1, a temperature of 500° C., a pressure of 10.9 atmospheres and a space velocity of 20 V/V/Hr for 1 hour.

The results of this test are shown in FIG. 1 where the concentrations of the desired product, toluene, and undesired hydrocracking products, C$_1$-C$_5$ alkanes, are plotted as a function of time in the reactor. FIG. 1 also shows the plots of data obtained under the same catalytic conditions for the same Pt-Ir/Al$_2$O$_3$ catalyst treated with hydrogen at 500° C. as described above but with the ethylene treatment omitted. It can be seen from FIG. 1 that the production rate of toluene is essentially identical for both the treated and untreated catalyst. However, the ethylene treated catalysts show the marked reduction in the production of C$_1$-C$_5$ alkanes which arise from exothermic hydrocracking reactions.

What is claimed is:

1. A method for pretreating a reforming catalyst comprising at least one Group VIII noble metal and a support, the method comprising contacting the catalyst with an unsaturated aliphatic hydrocarbon at a temperature from 200° to 500° C.

2. A method according to claim 1 wherein the unsaturated aliphatic hydrocarbon is an olefin.

3. A method according to claim 2 wherein the olefin is ethylene or propylene, or a mixture thereof.

4. A method according to claim 1 wherein the catalyst is contacted with the unsaturated aliphatic hydrocarbon at a temperature from 300° to 500° C.

5. A method according to claim 1 wherein the catalyst is contacted with the unsaturated aliphatic hydrocarbon for a period of 3 minutes to 2 hours.

6. A method according to claim 1 wherein the catalyst is contacted with the unsaturated aliphatic hydrocarbon by means of a gas stream containing from 0.1 to 10% by volume of the unsaturated aliphatic hydrocarbon.

7. A method according to claim 1 wherein the catalyst is a platinum-containing catalyst.

8. A method according to claim 1 wherein the catalyst comprises a combination of a Group VIII noble metal combined with rhenium, and a support.

9. A method according to claim 1 wherein the catalyst comprises a support and a metal or metal combination selected from the group consisting of platinum, platinum-iridium, platinum-rhodium, platinum-rhodium-iridium, platinum-rhenium, platinum-iridium-rhenium and palladium.

10. A method according to claim 1 wherein the support is selected from the group consisting of silica, alumina, amorphous silica-alumina and zeolites.

11. A method according to claim 1 wherein the support is a zeolite.

12. A method according to claim 1 wherein the support is L zeolite.

13. A method according to claim 1 wherein the catalyst is chemically reduced by treatment with hydrogen before it is contacted with the unsaturated aliphatic hydrocarbon.

14. A method according to claim 1 wherein after the catalyst has been contacted with the unsaturated aliphatic hydrocarbon, it is exposed to an inert gas at a temperature from 300° to 550° C.

15. A method according to claim 1 wherein after the catalyst has been contacted with the unsaturated aliphatic hydrocarbon, it is treated with hydrogen at a temperature from 250° to 650° C.

16. A method according to claim 1 wherein after the catalyst has been contacted with the unsaturated aliphatic hydrocarbon, it is exposed to an inert gas at a temperature from 300° to 550° C. and is then treated with hydrogen at a temperature from 250° to 650° C.

* * * * *